United States Patent
Imai

(10) Patent No.: US 8,269,443 B2
(45) Date of Patent: Sep. 18, 2012

(54) ROTARY ELECTRIC MACHINE CONTROL APPARATUS

(75) Inventor: Atsushi Imai, Gamagori (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 352 days.

(21) Appl. No.: 12/738,259

(22) PCT Filed: Oct. 1, 2008

(86) PCT No.: PCT/JP2008/067850
§ 371 (c)(1),
(2), (4) Date: Apr. 15, 2010

(87) PCT Pub. No.: WO2009/054239
PCT Pub. Date: Apr. 30, 2009

(65) Prior Publication Data
US 2010/0207559 A1    Aug. 19, 2010

(30) Foreign Application Priority Data
Oct. 22, 2007   (JP) .................................. 2007-273555

(51) Int. Cl.
*H02K 29/06* (2006.01)
*H02P 6/10* (2006.01)
(52) U.S. Cl. .................. 318/400.23; 318/430; 318/432; 701/22; 701/42
(58) Field of Classification Search ............. 318/400.23, 318/430, 432; 701/22, 42
See application file for complete search history.

(56) References Cited

U.S. PATENT DOCUMENTS

| | | | |
|---|---|---|---|
| 5,610,483 A | 3/1997 | Obara et al. | |
| 6,859,693 B2 * | 2/2005 | Tamagawa et al. | 701/22 |
| 7,725,227 B2 * | 5/2010 | Pattok et al. | 701/41 |
| 8,050,824 B2 * | 11/2011 | Tamaizumi et al. | 701/42 |
| 2003/0177846 A1 * | 9/2003 | Tamagawa et al. | 73/862.29 |
| 2008/0147276 A1 * | 6/2008 | Pattok et al. | 701/42 |
| 2009/0112405 A1 * | 4/2009 | Tamaizumi et al. | 701/42 |

FOREIGN PATENT DOCUMENTS

| | | |
|---|---|---|
| JP | 2003-061212 A | 2/2003 |
| JP | 2005-057929 A | 3/2005 |
| JP | 2005-061278 A | 3/2005 |
| JP | 2005-151797 A | 6/2005 |
| JP | 2006-109650 A | 4/2006 |
| JP | 2006-262573 A | 9/2006 |
| JP | 2006-314177 A | 11/2006 |
| JP | 2007-221896 A | 8/2007 |

OTHER PUBLICATIONS

Office Action issued Apr. 4, 2012 in German Patent Application No. 11 2008 002 805.2 and English translation thereof.

* cited by examiner

*Primary Examiner* — Paul Ip
(74) *Attorney, Agent, or Firm* — Kenyon & Kenyon LLP

(57) ABSTRACT

It is possible to suppress vibration of a rotary machine in a rotary machine control apparatus. A drive control system of a fuel cell vehicle having a rotary machine includes a control unit having: a drive permission power calculation module which calculates the rotary machine drive permission power according to the states of a fuel cell and an accumulator as power sources of the rotary machine: a limit torque calculation module which calculates a limit torque of the rotary machine according to the drive permission power; and a filter processing module which performs a low-pass process on the limit torque calculation. A storage device of the control unit stores a filter processing region map indicating the region where the filter process is executed by correlating the region with the drive permission power and the rpm.

2 Claims, 4 Drawing Sheets

ROTARY ELECTRIC MACHINE CONTROL APPARATUS

This is a 371 national phase application of PCT/JP2008/067850 filed 1 Oct. 2008, claiming priority to Japanese Patent Application No. JP 2007-273555 filed 22 Oct. 2007, the contents of which are incorporated herein by reference.

TECHNICAL FIELD

The present invention relates to a rotary electric machine control apparatus and, more particularly, to a rotary electric machine control apparatus for performing operation control of a rotary electric machine depending on a state of a power source.

BACKGROUND ART

A rotary electric machine is used as a drive source of a vehicle in an electric vehicle equipped with a fuel cell or a hybrid vehicle disposed with an engine and a rotary electric machine. The rotary electric machine is connected to a power source such as a fuel cell or a high-voltage electric storage device. The operation control of the rotary electric machine is performed while a state of the power source is monitored.

For example, Patent Document 1 discloses a controller of a fuel cell vehicle having a fuel cell and an electric double layer capacitor, which includes comprehending the upper limit total power that can be output based on the upper limit power generation amount of the fuel cell and the upper limit discharge amount of the capacitor to limit the upper limit of a torque command within the range thereof. As a result, if the fuel cell has an abnormality and the upper limit power generation amount decreases, it is described that the reduction of the upper limit total power is constrained by the discharge power of the capacitor and that the abrupt drop is constrained in the motor output torque based on the torque command.

Patent Document 1: Japanese Patent Application Laid-Open Publication No. 2003-61212

DISCLOSURE OF INVENTION

Problem to be Solved by the Invention

Patent Document 1 enables operation control of a rotary electric machine to be performed while the upper limit power generation amount of a power source is reached. If the upper limit power generation amount is supplied as a permissive power for the operation of the rotary electric machine as above, the rotary electric machine is supplied with a torque command within a range of the permissive power in accordance with a relation of power=torque×rotational speed. Since the relationship between a torque T and a rotational speed N has hyperbolic characteristics under the condition of the permissive power=constant, a torque change rate increases when the rotational speed decreases. For example, at the start of the electric machine, excessive torque fluctuations are generated by fluctuations of the rotational speed and this causes, for example, vibrations of a vehicle, which adversely affects user comfort.

It is the object of the present invention to provide a rotary electric machine control apparatus capable of suppressing vibrations of a rotary electric machine.

Means for Solving the Problem

A rotary electric machine control apparatus according to the present invention comprises a limit torque calculating unit that calculates a limit torque of a rotary electric machine based on a rotary electric machine drive permissive power set depending on a state of a power source of the rotary electric machine; and a filter processing unit that executes a low-pass filter process for the limit torque calculation.

In the rotary electric machine control apparatus according to the present invention, preferably, the filter processing unit changes a time constant of the low-pass filter process depending on at least one of a rotary electric machine drive permissive power and a rotary electric machine rotational speed.

In the rotary electric machine control apparatus according to the present invention, preferably, the filter processing unit sets a time constant when the rotary electric machine drive permissive power is equal to or less than a preliminarily defined predetermined value greater than a time constant when the predetermined value is exceeded.

In the rotary electric machine control apparatus according to the present invention, preferably, the filter processing unit sets a time constant when the rotary electric machine rotational speed is equal to or less than a preliminarily defined predetermined value greater than a time constant when the predetermined value is exceeded.

In the rotary electric machine control apparatus according to the present invention, preferably, the limit torque calculating unit determines the rotary electric machine drive permissive power depending on a state of at least one of a fuel cell and an electric storage device making up the power source of the rotary electric machine.

In the rotary electric machine control apparatus according to the present invention, preferably, the filter processing unit is executed within an area having a ratio of a change in the maximum available output torque to a change in the rotational speed of the rotary electric machine equal to or greater than a preliminarily defined predetermined value.

Effect of the Invention

With the above configuration, a rotary electric machine control apparatus executes a low-pass filter process for a limit torque of a rotary electric machine calculated based on a rotary electric machine drive permissive power. The low-pass filter process is a filter process of cutting a high-frequency component. This enables vibrations of the rotary electric machine to be suppressed by appropriately setting a frequency band to be cut.

In the rotary electric machine control apparatus, a time constant of the low-pass filter process is changed depending on at least one of a rotary electric machine drive permissive power and a rotary electric machine rotational speed. For example, if vibrations of the rotary electric machine are generated in association with the rotary electric machine drive permissive power and the rotary electric machine rotational speed, a time constant may be set such that the low-pass filter process causes an effect on an area portion of the generation to directly exhibit the response characteristics of the rotary electric machine in other area portions to ensure higher response under the higher drive permissive power, for example. This enables both the vibration suppression under the lower drive permissive power and the higher response under the higher drive permissive power.

In the rotary electric machine control apparatus, when the rotary electric machine drive permissive power is equal to or less than a preliminarily defined predetermined value, a time constant is set greater than a time constant when the predetermined value is exceeded. For example, if vibrations of the rotary electric machine are generated at the start, i.e., when the rotary electric machine drive permissive power is small, a time constant may be set greater such that the low-pass filter process causes an effect on an area portion of the generation to effectively perform the vibration suppression.

In the rotary electric machine control apparatus, when the rotary electric machine rotational speed is equal to or less than a preliminarily defined predetermined value, a time constant is set greater than a time constant when the predetermined value is exceeded. For example, if vibrations of the rotary electric machine are generated at the start, i.e., when the rotary electric machine rotational speed is small, a time constant may be set greater such that the low-pass filter process causes an effect on an area portion of the generation to effectively perform the vibration suppression.

In the rotary electric machine control apparatus, the rotary electric machine drive permissive power is determined depending on a state of at least one of a fuel cell and an electric storage device making up a power source of the rotary electric machine. If the fuel cell and the electric storage device are used as the power source of the rotary electric machine, the rotary electric machine permissive power is determined depending on the state of the power source to set a limit torque based thereon and this enables suppression of vibrations.

In the rotary electric machine control apparatus, the filter processing unit is executed within an area having a ratio of a change in the maximum available output torque to a change in the rotational speed of the rotary electric machine equal to or greater than a preliminarily defined predetermined value. Since the torque-rotational speed characteristics of the rotary electric machine are hyperbolic characteristics under the condition of constant power, a ratio of a change in the torque to a change in the rotational speed is increased when the rotational speed is smaller and the vibrations of the rotary electric machine are felt prominently in this area portion. Therefore, the vibration suppression may be effectively performed by executing the filter process in this area portion.

EXPLANATIONS OF LETTERS OR NUMERALS

10 vehicle drive control system, 12 rotary electric machine, 14 FC auxiliary machine, 16 brake pedal degree sensor, brake ECU, 20 accelerator opening amount sensor, 22 battery ECU, 30 power supply circuit, 32 electric storage device, 34, 38 smoothing condenser, 36 voltage converter, 40 voltage detector, 42 current detector, 44 fuel cell, 46 M/G inverter, 48 auxiliary machine inverter, 60 control unit, 62 storage device, 64, 65 filter process area map, 66 drive permissive power calculating module, 68 limit torque calculating module, 70 filter processing module, 72, 76 characteristic line, 74, 78 pulsating characteristic line, 77 low-pass filter process, 79 vibration suppression torque characteristics, 80 characteristic line corresponding to drive permissive power value, 81 (uniform) torque upper limit, and 82, 84 vibration suppression filter process area.

BEST MODE FOR CARRYING OUT THE INVENTION

An embodiment according to the present invention will be described in detail with reference to the following drawings. Although it is assumed that a rotary electric machine is mounted on a vehicle in the following description, the rotary electric machine may be one used in an application other than a vehicle, for example, a fixed rotary electric machine. Although a fuel cell and an electric storage device are included as a power source of the rotary electric machine in the following description, only a secondary cell may be used as the power source and an engine may be included that charges the secondary cell. Although a fuel cell mounted vehicle includes one rotary electric machine in the following description, a plurality of rotary electric machines may be included. Although the rotary electric machine will be described as a motor generator that has a function of a motor and a function of a generator, the rotary electric machine may only have a function of a motor and a vehicle may separately have a motor and a generator.

Although the case of limiting torque for vibration suppression at the start will be described in detail as limitation of a vehicle drive permissive power value, this is an example for explanation. The present invention may be implemented in other cases as long as a vehicle drive permissive power is limited by a preliminarily defined predetermined condition. For example, the present invention may be implemented when the vehicle drive permissive power is limited depending on a vehicle traveling condition or an environmental situation of a vehicle. Although a power supply circuit has a configuration including a high-voltage electric storage device, a fuel cell, a voltage converter, and an inverter operated at high voltage in the following description, other elements may be included. For example, a system main relay, a low-voltage cell, a DC/DC converter operated at low voltage, etc., may be included.

Figure 1:
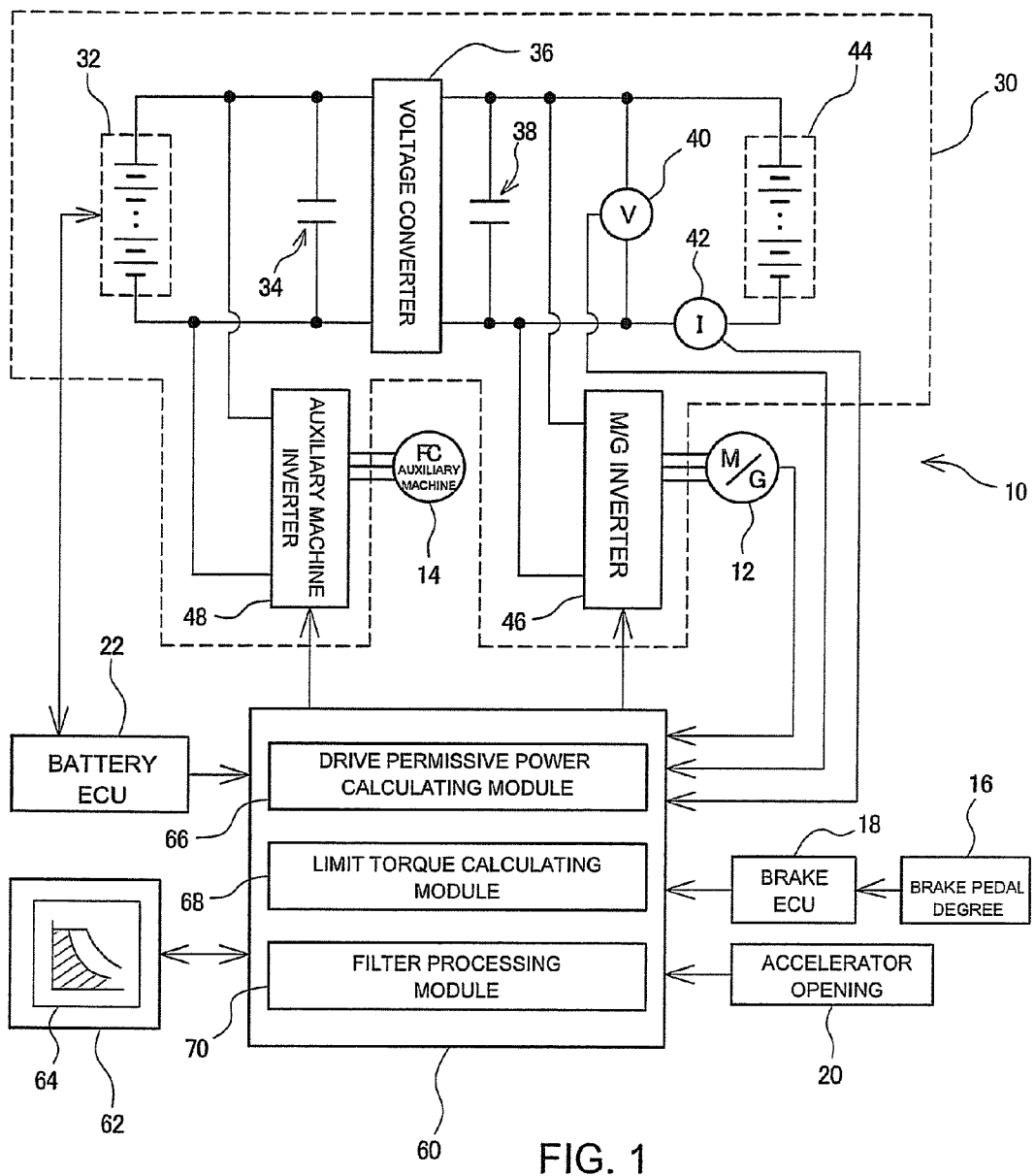
FIG. 1 is a diagram of a configuration of a drive control system of a fuel cell equipped vehicle including a rotary electric machine in an embodiment according to the present invention.

FIG. 1 is a diagram of a configuration of a drive control system 10 of a fuel cell equipped vehicle including a rotary electric machine. Particularly, rotary electric machine control will be described herein that executes a filter process for a limit torque of a rotary electric machine calculated based on the drive permissive power of the rotary electric machine to suppress vibrations generated at the start of a vehicle.

The drive control system 10 includes a power supply circuit 30 having a fuel cell 44 and an electric storage device 32 that is a secondary cell; a rotary electric machine 12 and a fuel cell auxiliary machine (FC auxiliary machine) 14 connected thereto; a brake pedal degree sensor 16 and a brake ECU (Electric Control Unit) that define a drive request of the vehicle; an accelerator opening amount sensor 20; a battery ECU 22 that controls the charge/discharge of the electric storage device 32; a control unit 60; and a storage device 62 connected to the control unit 60.

The rotary electric machine 12 is a motor generator (M/G) mounted on the vehicle and is a three-phase synchronous rotary electric machine that functions as a motor when power is supplied and as a generator at the time of braking. The rotational speed of the rotary electric machine 12 is detected by a suitable detecting unit and the detection value is transmitted to the control unit 60.

The FC auxiliary machine 14 is an auxiliary machine used by the fuel cell 44 and includes an air compressor (ACP) provided in an oxidation gas flow channel, a hydrogen pump provided on a fuel gas flow channel, a fuel cell cooling pump, etc. The FC auxiliary machine 14 is supplied and operated with a high-voltage power on the order of about 200 V, for example. FC is an abbreviation of Fuel Cell representative of the fuel cell 44. The fuel cell 44 will hereinafter be referred to as FC when needed.

The power supply circuit 30 is a circuit connected to the rotary electric machine 12 that is a motor/generator and the FC auxiliary machine 14. With regard to the rotary electric machine 12, the power supply circuit 30 has a function of supplying power to the rotary electric machine 12 when the rotary electric machine 12 functions as a drive motor or receiving regenerative power to charge the electric storage device 32 that is the secondary cell when the rotary electric machine 12 functions as a generator. With regard to the FC auxiliary machine 14, the power supply circuit 30 has a function of supplying high-voltage power necessary for the operation of the FC auxiliary machine 14.

The power supply circuit 30 includes the electric storage device 32 that is the secondary cell, a smoothing condenser 34 on the electric storage device side, a voltage converter 36, a smoothing condenser 38 on the fuel cell side, the fuel cell 44, an M/G inverter 46 connected to the rotary electric machine 12, and an auxiliary machine inverter 48 connected to the FC auxiliary machine 14.

The electric storage device 32 is a chargeable/dischargeable high-voltage secondary cell and has a function of exchanging electric power with the fuel cell 44 through the voltage converter 36 to accommodate the fluctuations of loads of the rotary electric machine 12, the FC auxiliary machine 14, etc. The electric storage device 32 may be a lithium-ion battery pack or a nickel-hydrogen battery pack or a capacitor having a terminal voltage of about 200 V to about 300 V, for example. The electric storage device 32 is a so-called high-voltage battery and the electric storage device 32 is often simply referred to as a battery. Therefore, the electric storage device 32 will hereinafter be referred to as a battery when needed.

The voltage converter 36 is a circuit having a function of exchanging electric power in accordance with a voltage difference between a high voltage on the side of the electric storage device 32 and a high voltage on the side of the fuel cell 44. For example, if a voltage on the side of the fuel cell 44 is lower, a high-voltage power is supplied from the side of the electric storage device 32 to the side of the fuel cell 49 while the voltage conversion is performed and, conversely, if a voltage on the side of the electric storage device 32 is lower, a high-voltage power is supplied from the side of the fuel cell 44 to the side of the electric storage device 32 while the voltage conversion is performed. The voltage converter 36 may be a bidirectional converter including a reactor.

A smoothing condenser is provided on each of the two sides of the voltage converter 36. The smoothing condenser 34 on the electric storage device side is provided between a positive electrode bus line and a negative electrode bus line linking the voltage converter 36 and the electric storage device 32, and the smoothing condenser 38 on the fuel cell side is provided between the positive electrode bus line and the negative electrode bus line linking the voltage converter 36 and the fuel cell 44.

The fuel cell 44 is a kind of a battery pack configured by combining a plurality of fuel battery cells to take out high-voltage generated power in the order of about 200 V to about 300 V, and is referred to as a fuel-cell stack. Each of the fuel battery cells has a function of supplying hydrogen as a fuel gas to the anode side and air as an oxidation gas to the cathode side to take out necessary electric power from the battery chemical reaction through an electrolyte membrane that is a solid polymer membrane. The operation of the FC auxiliary machine 14 is necessary for operating the fuel cell 44.

A voltage detector 40 is provided between the positive electrode bus line and the negative electrode bus line linking the fuel cell 44 and the voltage converter 36 and has a function of detecting an output voltage value of the fuel cell 44. A current detector 42 is provided on either the positive electrode bus line or the negative electrode bus line, and has a function of detecting an output current value of the fuel cell 44. The detected value of the voltage detector 40 and the detected value of the current detector 42 are transmitted to the control unit 60 through an appropriate signal line.

The M/G inverter 46 is a circuit having a function of converting high-voltage direct-current power into alternating-current three-phase drive power for supplying power to the rotary electric machine 12, and a function of conversely converting alternating-current three-phase regenerative power into high-voltage direct-current charging power under the control of the control unit 60. The M/G inverter 46 may be made up of a circuit including a switching element, a diode, etc.

The auxiliary machine inverter 48 has a function of converting high-voltage direct-current power into alternating-current three-phase drive power for supplying the power to the FC auxiliary machine 14 under the control of the control unit 60. The configuration of the auxiliary machine inverter 48 is basically the same as the M/G inverter 46.

The elements connected to the control unit 60 will then be described. The brake pedal degree sensor 16 is a sensor that detects an operation amount of a brake pedal, etc. A brake ECU 18 has a function of receiving and converting a detected value of the brake pedal degree sensor 16 into a brake request torque to the rotary electric machine 12 for input into the control unit 60. The accelerator opening amount sensor 20 has a function of detecting and converting an operation amount of an accelerator pedal, etc., into a drive request torque to the rotary electric machine 12 for input into the control unit 60. The brake pedal degree sensor 16 and the accelerator opening amount sensor 20 are means operated by a user for giving instructions for the request torques to the rotary electric machine 12.

The battery ECU 22 is a control device having a function of detecting a state of the electric storage device 32 that is a high-voltage battery to control the charge/discharge state thereof to achieve the appropriate state. For example, an output voltage, an input/output current, a temperature, SOC (State Of Charge), etc., are monitored as the states of the electric storage device 32, and the values thereof are transmitted to the control unit 60 as needed.

The storage device 62 connected to the control unit 60 has a function of storing programs, etc., executed in the control unit 60 and, particularly, a function of storing a filter process area map 64 used when a filter process is executed for vibration suppression.

Figure 2:
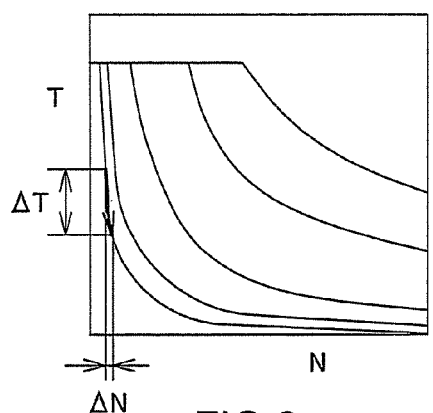
FIG. 2 is a characteristic diagram of a relationship between a torque and a rotational speed.
Figure 3:
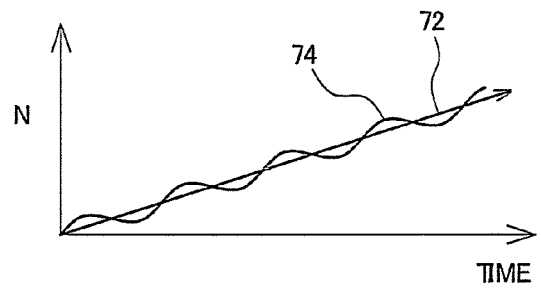
FIG. 3 is a diagram for explaining states of changes in the rotational speed and changes in the torque at the start of the rotary electric machine.
Figure 3:
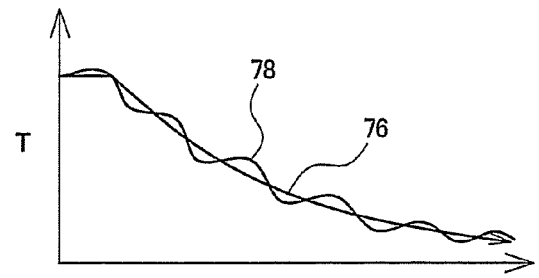

Before describing the contents of the filter process area map 64, the vibration suppression at the start will be described as a background with reference to FIGS. 2 and 3. Reference numerals of FIG. 1 will be used in the following description. FIG. 2 is a characteristic diagram of a relationship between a torque T and a rotational speed N. FIG. 3 is a diagram of states of changes in the rotational speed N and changes in the torque T at the start of the rotary electric machine 12.

As depicted in FIG. 2, the torque T and a rotational speed N of the rotary electric machine 12 exhibit hyperbolic characteristics under the electric power supplied to the rotary electric machine 12, i.e., under the constant power. This is based on a relationship of electric power=power=torque T×rotational speed N. Actually, since the maximum limit of the torque is prescribed, the hyperbolic characteristics are truncated at the upper limit. FIG. 2 depicts five T-N characteristic lines corresponding to five types of supply power.

Considering the start of the rotary electric machine 12, when the rotational speed N gradually increases from zero with the supply of appropriate starting power, the rotational speed N changes at a sharply sloping portion of the hyperbolic characteristics since the starting power is small and the rotational speed N is low. In FIG. 2, the change is indicated by an arrow of the T-N characteristic line corresponding to the smallest supply power, and it is seen that $\Delta T$, i.e., the change in the torque T, is a value greater than $\Delta N$, i.e., the change in the rotational speed. In the extreme case, $\Delta T/\Delta N$ becomes close to infinity.

FIG. 3 depicts actual changes in the rotational speed N and changes in the torque T at the start of the rotary electric machine 12. In FIG. 3, an upper view is plotted with time as the horizontal axis and the rotational speed N as the vertical axis, and a lower view is plotted with time as the horizontal axis and the torque T as the vertical axis. The original points of time are matched on the upper and lower sides. At the start, the rotational speed N is gradually increased from zero to a higher rotation rate in accordance with the command from the control portion 60. In FIG. 3, the rotational speed N is represented by a characteristic line 72 that rises substantially linearly over time. Correspondingly, the torque T is represented by a characteristic line 76 that falls over time under the condition of the constant supply power value=power value. Since $\Delta T/\Delta N$ is a large value as above, the torque T is fluctuates considerably with variations of the rotational speed N.

In such a case where the rotary electric machine 12 is mounted on a vehicle, a vibration system is formed by the mass of the rotary electric machine 12 and a spring component of a supporting structure. Therefore, when the rotary electric machine 12 is operated, vibrations of the vibration system overlap with the characteristics of the rotational speed N. Since vibrations are also generated in a sensor system, the rising characteristics of the rotational speed N at the start exhibit characteristics represented as a pulsating characteristic line 74. Since pulsations of the rotational speed N are generated if a pulsating waveform overlaps with the changes in the rotational speed N in this way, the pulsation of the torque is increased as represented by a pulsating characteristic line 78 because $\Delta T/\Delta N$ is large as above. This leads to the vibrations at the start, causing adverse effect on user comfort.

Figure 4:
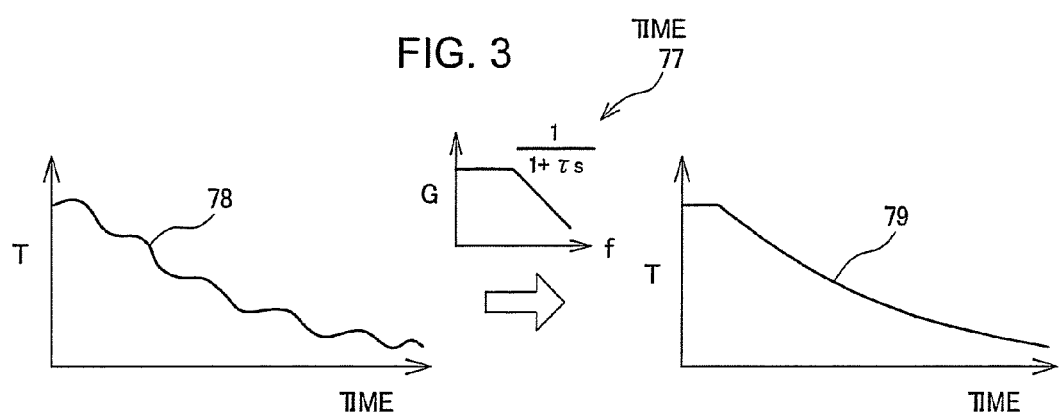
FIG. 4 is a diagram for explaining a state of a filter process in the embodiment according to the present invention.

A filter process may be used as a method of suppressing the variations at the start as above. FIG. 4 is a diagram of a state of the filter process. The filter process is a process of reducing a gain at a predetermined frequency band and a low-pass filter process is executed to reduce a gain of a frequency band equal to or greater than a predetermined frequency f in this case. The low-pass filter process is represented as gain=1/(1+τs), where τ is a time constant, and therefore also referred to as a first-order lag filter process. This time constant τ is usable at the frequency at which the gain starts falling. A left view of FIG. 4 corresponds to the lower view of FIG. 3 and depicts the pulsating characteristic line 78 of the torque. When the torque characteristics are subjected to a low-pass filter process 77, vibration suppression torque characteristics 79 are formed with the pulsation of the high-frequency component removed as depicted in a right view of FIG. 4.

When the torque characteristics of the rotary electric machine are subjected to the low-pass filter process, the torque response characteristics of the rotary electric machine become slow. For example, when the rotary electric machine is supplied with a higher drive permissive power and operated at a higher torque and a higher rotation rate, a high-speed response to a torque command is desired. Since the vibrations at the start are generated in the case of a lower drive permissive power or a lower rotational speed as above, if the filter process is executed only for the area portion of the generation of vibrations, this enables both the vibration suppression under the lower drive permissive power and the high-speed response under the higher drive permissive power.

Figure 5:
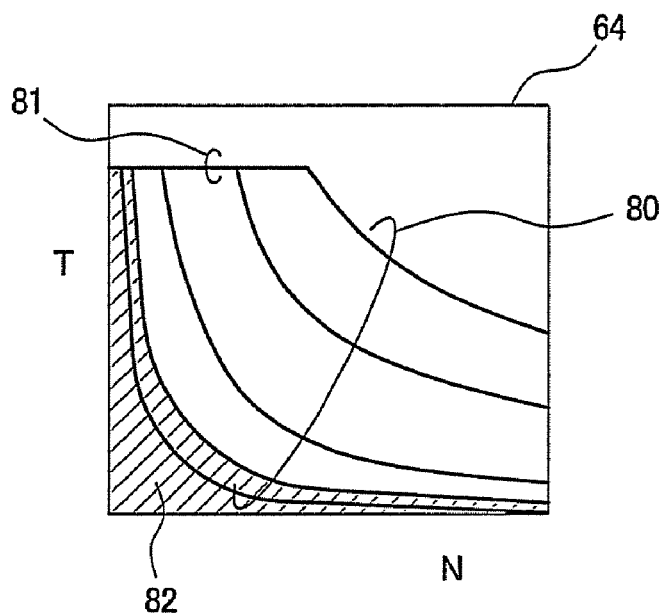
FIG. 5 is a diagram for explaining a filter process area map in the embodiment according to the present invention.

The filter process area map 64 mentioned with reference to FIG. 1 is used for this purpose. Reference numerals of FIGS. 1 to 4 will be used in the following description. The vibrations at the start are prominent when the speed is low with the small rotational speed N, and $\Delta T/\Delta N$ is somewhat large. The filter process may be executed for the torque characteristics of the rotary electric machine 12 in an area having N smaller than a predefined value and $\Delta T/\Delta N$ larger than a predefined value in the torque T-rotational speed N characteristics. The area of execution of the filter process is set in a correlated manner with the drive permissive power and the rotational speed. FIG. 5 is a diagram for explaining the filter process area map 64 indicative of the area of execution of the filter process for the vibration suppression at the start.

FIG. 5 depicts five types of characteristic lines 80 corresponding to the supply power values, i.e., the drive permissive power values for the rotary electric machine 12. An area of the drive permissive power value equal to or less than the characteristic line of the fourth largest drive permissive power value is shaded, and the shaded area portion of the lower drive permissive power value is a vibration suppression filter process area 82 of the filter process executed for the vibration suppression. The filter process is not executed in the non-shaded area portion of the higher drive permissive power value to ensure higher response to a torque command.

Although a uniform torque upper limit 81 is depicted in FIG. 5, this is irrelevant to the filter process for the vibration suppression at the start and indicates that a greater torque is not permitted in general because of the configuration of the system. This may be referred to as a general torque upper limit.

Figure 6:
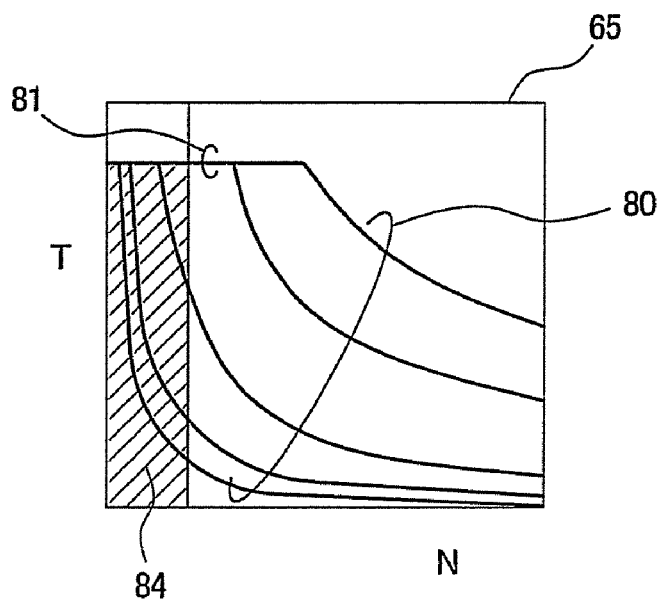
FIG. 6 is a diagram of another filter process area map in the embodiment according to the present invention.

Although the filter process for the vibration suppression is executed depending on the drive permissive power value in FIG. 5, the filter process for the vibration suppression may be executed depending on the rotational speed N of the rotary electric machine 12. FIG. 6 is a diagram of an example of a filter process area map 65 when the filter process is executed depending on the rotational speed N. The five characteristic lines 80 are depicted as in FIG. 5, and an area of the lower rotational speed having the rotational speed N smaller than a preliminarily defined predetermined value is shaded in this case. The shaded area portion of the lower rotational speed is a vibration suppression filter process area 84 of the filter process executed for the vibration suppression. The filter process is not executed in the non-shaded area portion of the high-speed rotational speed to ensure higher response to a torque command.

The area portion of the filter process executed for the vibration suppression may be determined with the method based on the drive permissive power described in FIG. 4, the method based on the rotational speed N described in FIG. 5, or a setting method based on both. For example, in FIG. 4, the filter process for the vibration suppression may be executed for a further narrowed area portion equal to or less than a predefined predetermined rotational speed within the shaded area portion.

For the vibration suppression filter process areas 82, 84 and other areas, the filter process may be executed for the former and no filter process may be executed for the latter. Alternatively, a suitable filter process may be executed for the latter to make a difference between the former and the latter in the setting of the time constant of the filter process. In this case, the time constant in the vibration suppression filter process area 82 is set larger than the time constant of other area portions. In the example of FIG. 5, when the rotary electric machine drive permissive power is equal to or less than a preliminarily defined predetermined value, the time constant is set larger than the time constant when the predetermined value is exceeded. In the example of FIG. 6, when the rotational speed N is equal to or less than a preliminarily defined predetermined value, the time constant is set larger than the time constant when the predetermined value is exceeded. By combining these methods, the filter process for the vibration suppression may be executed in an area having a ratio of the change in the torque $\Delta T$ to the change in the rotational speed $\Delta N$ of the rotary electric machine 12 equal to or greater than a preliminarily defined predetermined value.

Returning to FIG. 1, the storage device 62 stores the filter process area maps 64, 65 described in FIGS. 5 and 6. The filter process area maps 64, 65 indicate the areas of the filter process executed for the vibration suppression and, therefore, may be stored in a format capable of setting an area portion of the filter process executed for the vibration suppression other than a map form. For example, the maps may be stored in a table format or a calculation format for a conversion chart using the drive permissive power value as input to output the time constant of the filter process. The maps may have a format using the rotational speed of the rotary electric machine as input to output the time constant of the filter process.

The control unit 60 has a function of generally controlling the elements of the drive control system 10 and particularly has a function of executing the filter process for the vibration suppression as above. The control unit 60 corresponds to a rotary electric control apparatus in the drive control system 10 of a vehicle. The control unit 60 includes a drive permissive power calculating module 66 that calculates the drive permissive power of the rotary electric machine depending on the state of the fuel cell 44 and the electric storage device 32 forming the power source of the rotary electric machine 12; a limit torque calculating module 68 that calculates a limit torque of the rotary electric machine 12 based on the drive permissive power; and a filter processing module 70 that executes the low-pass filter process for the limit torque calculation.

The control unit 60 may be made up of a computer suitable for mounting on a vehicle. Although the control unit 60 may be made up of a single computer, if a vehicle-mounted ECU, etc., additionally exists, the function of the control unit 60 may be a part of the function of the vehicle-mounted ECU. The functions of the control unit 60 may be implemented by software and may be implemented by executing a corresponding rotary electric machine control program, for example.

Figure 7:
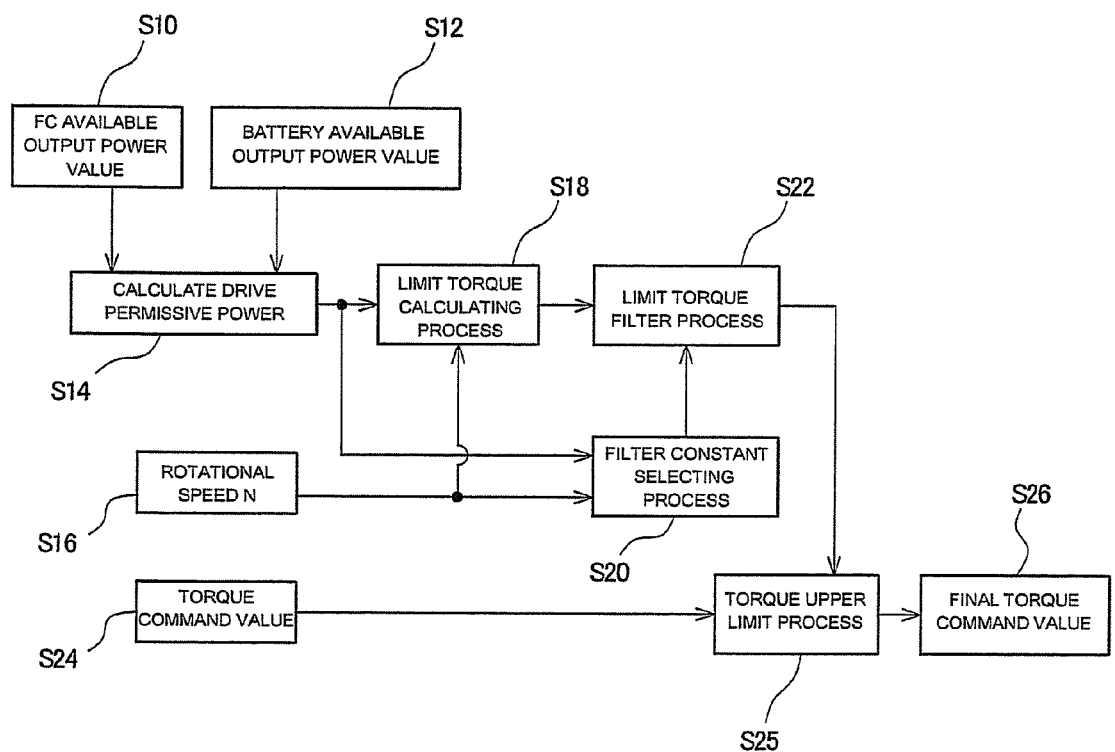
FIG. 7 is a block diagram of functions of a control unit in the embodiment according to the present invention.

The effects of the above configuration, especially, the functions of the control unit 60, will be described in more detail with reference to FIG. 7. Reference numerals of FIGS. 1 to 6 will be used in the following description. FIG. 7 corresponds to a block diagram representative of the functions of the control unit 60 and the description will be made from a standpoint of procedures executed by the control unit 60. Therefore, these procedures correspond to respective process procedures of the corresponding rotary electric machine control program.

When the rotary electric machine control program is activated, an FC available output power value and a battery available output power value are acquired for calculating the drive permissive power (S10, S12). The maximum available output power value of the fuel cell 44 is calculated based on the detected value of the voltage detector 40, the detected value of the current detector 42, etc., and the maximum available output power value of the electric storage device 32 is calculated based on the state quantity of the electric storage device 32 from the battery ECU 22, etc.

The drive permissive power value for the rotary electric machine 12 is calculated in consideration of the power consumption of the FC auxiliary machine 14, the conversion efficiency of the voltage converter 36, etc., as needed, along with the state quantities of the power source of the rotary electric machine 12 such as the maximum available output power value of the fuel cell 44 and the maximum available output power value of the electric storage device 32 (S14). This procedure is executed by the function of the drive permissive power calculating module 66 of the control unit 60. The characteristic lines 80 described in FIGS. 5 and 6 are the torque T/rotational speed N characteristic lines corresponding to the calculated drive permissive power value. For example, if the calculated drive permissive power value is 10 kW, the characteristic line of the power value=10 kW=constant has hyperbolic characteristics on the T-N plane.

Therefore, the rotational speed N is given (S16) to execute the limit torque calculating process (S18). This function is executed by the function of the limit torque calculating module 68 of the control unit 60. Assuming N=600 rpm=10 rps=10 Hz, for example, a torque is calculated from an expression of the drive permissive power value=10 kW=T× N=T×10 rps in the above example and this is the limit torque under the drive permissive power value. A term "limit" means a limit in the drive permissive range and means that the torque of the rotary electric machine 12 is able to be output at the calculated torque or less.

The time constant of the filter process is selected based on the calculated drive permissive power value and the given rotation value (S20). Once the time constant of the filter process is selected, the time constant is used to execute the filter process for torque characteristics (S22). These procedures are executed by the function of a filter processing module 70 of the control unit 60. Specifically, the filter process area map 64 is read from the storage device 62, and the drive permissive power and the rotational speed are used as retrieval keys to read a time constant of the filter process corresponding to this condition. In the above example, the drive permissive power value=10 kW and the rotational speed N=10 rps=10 Hz are used as retrieval keys to acquire the corresponding time constant from a map or a correlation table, or a calculation equation.

For example, when the drive permissive power value=10 kW and the rotational speed N=10 rps=10 Hz of the above condition are included in the area portion of the filter process executed for the vibration suppression, the time constant of the filter process is selected as a larger value as compared to other area portions. This constrains the high-frequency component of the vibrations as described in FIG. 4. On the other hand, if the filter process for the vibration suppression is not executed in other areas having a larger drive permissive power value or the rotational speed N that is a high-speed rotational speed, the time constant of the filter process is selected as a smaller value. Therefore, the high-speed response to the torque command may be ensured at the time of the higher drive permissive power value, for example.

Once the filter process is executed for the torque characteristics, a torque command value is acquired (S24) and a torque upper limit process is executed (S25) to calculate the final torque command value. The torque upper limit process unit the uniform torque upper limit 81 that is a general torque upper limit described in FIGS. 5 and 6. However, if a torque limit based on the configuration of the drive control system 10 of the vehicle exists other than this uniform torque upper limit, such an upper limit may be included to calculate the final torque command. The filter process for the vibration suppression is executed as above.

The invention claimed is:

1. A rotary electric machine control apparatus comprising:
   a drive permissive power calculating unit that calculates a rotary electric machine drive permissive power by obtaining a state of a power source of the rotary electric machine;
   a unit that detects a rotary electric machine rotational speed;
   a limit torque calculating unit that calculates a limit torque of the rotary electric machine based on the rotary electric machine drive permissive power and the rotary electric machine rotational speed;
   a filter processing unit that executes a low-pass filter process for the limit torque calculation; and
   a unit that outputs a torque command based on a limit torque subjected to a filter process and a request torque for the rotary electric machine,
   the filter processing unit selecting a time constant of the low-pass filter process based on the rotary electric machine drive permissive power and the rotary electric machine rotational speed, and
   in a vibration generating area having a possibility to generate vibration at the start of the rotary electric machine having the rotary electric machine drive permissive power equal to or less than a preliminarily defined predetermined permissive power value and the rotary electric machine rotational speed equal to or less than a preliminarily defined predetermined rotational speed value, the filter process being executed with a time constant of the low-pass filter set greater than a time constant when the predetermined permissive power value or the predetermined rotational speed value is executed.

2. The rotary machine control apparatus of claim 1, wherein
   the drive permissive power calculating unit calculates a rotary electric machine drive permissive power depending on a state of at least one of a fuel cell and an electric storage device making up the power source of the rotary electric machine; and
   the filter processing unit executes a low-pass filter process that reduces a gain in a frequency band equal to or greater than a predetermined frequency.

* * * * *

UNITED STATES PATENT AND TRADEMARK OFFICE
CERTIFICATE OF CORRECTION

PATENT NO. : 8,269,443 B2
APPLICATION NO. : 12/738259
DATED : September 18, 2012
INVENTOR(S) : Atsushi Imai Page 1 of 1

It is certified that error appears in the above-identified patent and that said Letters Patent is hereby corrected as shown below:

| Column | Line | |
|---|---|---|
| 3 | 60 | Change "sensor, brake" to --sensor, 18 brake--. |
| 5 | 52 | Change "fuel cell 49" to --fuel cell 44--. |

Signed and Sealed this
Twelfth Day of February, 2013

Teresa Stanek Rea
*Acting Director of the United States Patent and Trademark Office*